Oct. 17, 1944. W. L. CARLSON ET AL 2,360,810
SELF-ORIENTING RADIO DIRECTION FINDER
Filed March 19, 1938
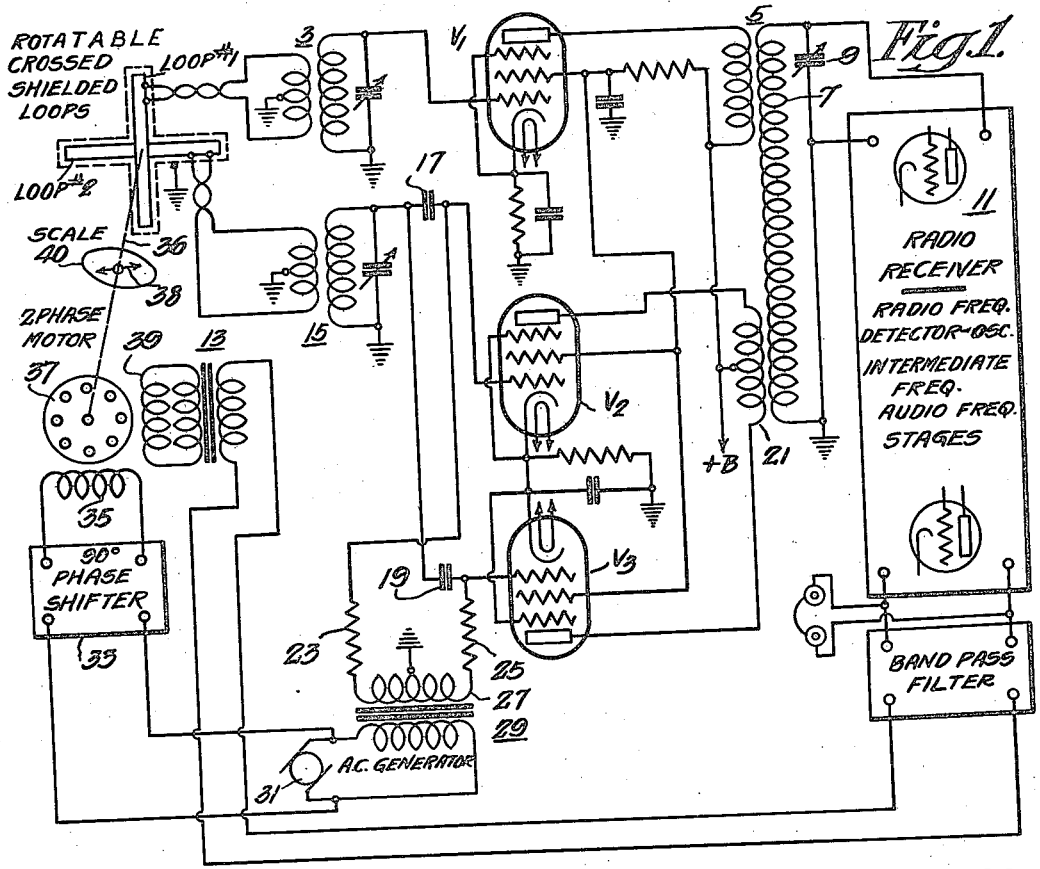
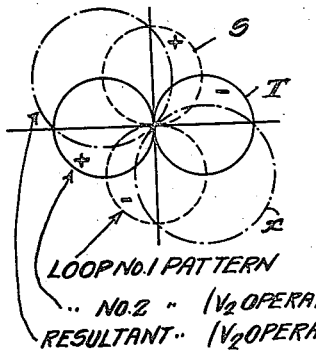
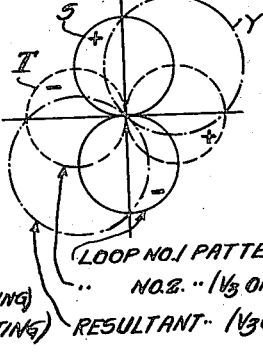
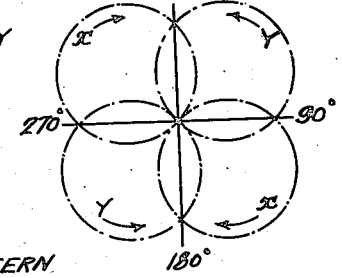
Inventors
WENDELL L. CARLSON
DONALD S. BOND
By
Attorney Patented Oct. 17, 1944

2,360,810

UNITED STATES PATENT OFFICE 2,360,810

SELF-ORIENTING RADIO DIRECTION FINDER

Wendell L. Carlson, Haddonfield, N. J., and Donald S. Bond, Philadelphia, Pa., assignors to Radio Corporation of America, a corporation of Delaware Application March 19, 1938, Serial No. 196,816

11 Claims. (Cl. 250—11)

Our invention relates to radio direction finders and more specifically to radio direction finders in which directive antennas are self-oriented.

We are aware that self-orienting directive antennas have been used in connection with radio receivers for direction finding. In some installations, signals from the directive antenna are combined with signals from a nondirective antenna, whereby a cardioid pattern may be obtained. If the cardioid pattern is used, no ambiguity is present because the directive antenna is oriented at the proper one of its null positions to indicate the direction of the transmitting station from which signals are being received, i. e., the wave front of the signal waves. Since such devices are operated at a point of minimum response, we have found that, because of the inability to shield the nondirective antenna, such systems tend to be unreliable in the presence of "rain static." In order that a self-orienting direction finder may be used during the presence of "rain static," we have found it expedient to use crossed shielded loop antennas which are comparatively free of undesired response from "rain static." While self-orienting, crossed loops will have 180° ambiguity; this is preferable to having no directive indication whatsoever, or manually operating a directive loop.

It is one of the objects of our invention to provide means in a direction finder whereby self-orienting loops are used to indicate direction. Another object of our invention is to provide means in a self-orienting or "left-right" direction finder whereby the device will operate in the presence of "rain static." Another object of our invention is to provide means whereby a reversible motor operates to orient a pair of crossed loops to indicate the wave front of received signals. A further object is to provide crossed loops whereby one loop is operating at its null position when the other loop is operating at or near its maximum and in which the latter loop may be used to receive communication signals simultaneously with the self-orientation of the loops.

In describing the invention, reference will be made to the accompanying drawing in which Figure 1 is a schematic circuit diagram of one embodiment of the invention; and Figures 2a, 2b and 2c are response patterns which are used to illustrate the theory of operation.

Referring to Fig. 1, a shielded loop antenna 1 is connected to the primary of the radio frequency transformer 3. The secondary of the radio frequency transformer is connected to a radio frequency amplifier tube $V_1$. The output of the radio frequency tube $V_1$ is connected to the primary of the radio frequency transformer 5. The secondary 7 of the radio frequency transformer 5 is preferably tuned to resonance by a variable capacitor 9. The secondary circuit 7, 9 is connected to a radio receiver 11 which may include a radio frequency amplifier, detector-oscillator, intermediate frequency amplifier, second detector, automatic sensitivity control, and audio frequency amplifier. Inasmuch as the radio receiver per se is not our invention and is well known to those skilled in the art, no detailed description of the circuits is necessary. The output from the audio stages of the radio receiver is connected through a band pass filter to a transformer 13. The audio output circuit may be connected to telephone receivers, which are used for communication purposes.

Loop 2 is angularly disposed with respect to loop 1. Both loops 1 and 2 are shielded and are rotatable together by means of a common shaft which is connected to a motor hereinafter described. It should be understood that the loop terminals may be connected through slip rings and brushes not shown. The terminals of the second loop are connected to the primary of a radio frequency transformer 15. One terminal of the secondary of this transformer is grounded. The other terminal is connected through capacitors 17, 19 to the respective control grids of the thermionic tubes $V_2$ and $V_3$, which are connected to function as a balanced modulator. The anode circuits of tubes $V_2$ and $V_3$ are connected in push-pull relation to a primary winding 21 which is coupled to the secondary 7 of the radio frequency transformer 5. The mid-point of the primary winding 21 is connected to B+.

The control grids of the balanced modulator tubes $V_2$ and $V_3$ are also connected through impedances 23, 25 to the secondary 27 of an audio frequency transformer 29. The secondary winding 27 is grounded at its mid-point. The primary winding of the audio frequency transformer is connected to an A.-C. generator 31 or any suitable source of audio frequency current. The A.-C. is also connected through a phase shifter 33 to a field winding 35 of a two-phase motor 37. The other field winding 39 of the motor is connected to the output of the audio frequency amplifier by means of the audio frequency transformer 13. The rotor of the two-phase motor is coupled to the rotatable shaft of the loops 1 and 2. The coupling 36 between the motor 37 and the loops Nos. 1 and 2 preferably includes a pointer member 38 and a scale 40.

The operation of the foregoing circuit is as follows: Radio frequency currents induced in loop No. 1 are amplified by the tube $V_1$ and provide a carrier frequency which is applied to the radio receiver 11. Radio frequency currents induced in loop No. 2 are applied to the modulators $V_2$, $V_3$ but since these tubes are connected in push-pull relation and are balanced, the carrier frequency currents are eliminated. However, the audio frequency currents applied from the A.-C. generator 31 alternately "key-on" one of the tubes $V_2$ and key-off the other tube, thus modulating the signal currents induced in loop No. 2 and providing currents of sideband frequencies, which are also applied to the radio receiver.

The pattern of loop No. 1 will be a figure 8, such as shown by S in Fig. 2a. The pattern of loop No. 2 is also a figure 8, as indicated by T. When the modulator tube $V_2$ is operating, the phases of the currents in the two loops (each having a figure 8 response characteristic) combine to form a directive pattern X. When the tube $V_3$ is operating, the resultant pattern Y is shown in Fig. 2b. Since the resultant patterns X and Y alternately appear at the frequency of the A.-C. source 31, these resultant patterns will appear as shown in Fig. 2c. It will be seen that the pattern X represents currents which tend to rotate the motor 37 in a clockwise direction, while the currents represented by Y tend to rotate the motor in a counter-clockwise direction.

If loop No. 1 is oriented along the line 0°–180°, and provided the signal originates along this line, the effects of the currents represented by X and Y will be equal and opposite so that the rotor of the motor 37 will be stationary. If the loop No. 1 is oriented at any other position excepting 90°–270°, and provided the signal originates along the line 0°–180°, the currents represented by X and Y will be unequal and therefore their resultant will operate the rotor of the motor 37 in such a direction as to approach the nearer of the two points 0°–180°. If, however, the loop No. 1 lies along the line 90°–270°, and assuming that the signal is arriving from a direction corresponding to the line 0°–180°, no carrier frequency currents from loop No. 1 will be present and, therefore, an equilibrium position will be found which, however, will be unstable. A slight transient current will be sufficient to unbalance the resultant currents in one direction or the other such that the rotor will revolve until loop No. 1 is driven to the position 0°–180°, the pointer which corresponds in position to loop No. 1 will indicate the direction from which the signals are being received. Thus, if loop No. 1 assumes any position other than 0°–180°, the currents in the field winding 39 will not be zero and will be of such phase that rotation will take place until the current becomes zero.

Thus, the invention has been described as a pair of rotatable crossed shielded loops which are connected to the rotor of a reversible motor. The signals from one of the loops provide carrier frequency currents. The signals from the other loop are applied to a pair of tubes connected in balanced relation and arranged for alternate operation. The keying or modulation frequency currents appear in the radio receiver output as an audio frequency current whose amplitude varies and whose phase reverses as a function of the loop position. The output current of reversible phase and a current of fixed phase are applied to a two-phase motor which is suitably coupled to the loops, to thereby rotate the loops until the reversible phase current becomes substantially zero.

While we have shown loop antennas arranged to cross each other at right angles, other angular disposition of the loops may be used. Likewise, any directive antenna may be used in place of the loops. For example, a dipole is an equivalent of a loop in its directive pattern. In some installations, such as an aircraft, the directive antennas may be fixedly mounted on the craft, and the motor used to orient the craft by suitable means. If the system is used for communication purposes, the directive antenna receiving the carrier currents, which will include the signalling currents, will automatically have a maximum response because the other directive antenna will be oriented to have a minimum response, and therefore communication will be at maximum response and directional indication most sharply defined at the same time. Furthermore, this condition of effective communication response and directive indication will be continuously maintained.

We claim as our invention:

1. A direction finder including, in combination, a pair of crossed loops, means connecting one of said loops to a radio frequency amplifier, means connecting the other of said loops to a balanced modulator, an audio frequency current source, means for applying an audio frequency current from said source to said balanced modulator, a radio receiver, means coupling said radio frequency amplifier and said balanced modulator output to said receiver, a two-phase motor, said motor being operated by currents of said source and by the output currents of said receiver, and means coupling said loops to said motor whereby the loops are oriented by said motor until the output currents become substantially zero.

2. A direction finder including, in combination, a pair of crossed loops, means for effectively shielding each of said loops from rain static, means connecting one of said loops to a radio frequency amplifier, means connecting the other of said loops to a balanced modulator, an audio frequency current source, means for applying an audio frequency current from said source to said balanced modulator, a radio receiver, means coupling said radio frequency amplifier and said balanced modulator output to said receiver, a two-phase motor, said motor being operated by currents of said source and by the output currents of said receiver, and means coupling said loops to said motor whereby the loops are oriented by said motor until the output currents become substantially zero.

3. In a radio direction finder, the combination of a pair of directive antennas, said antennas arranged for rotation, a radio receiving device, means for applying signal currents induced in one of said antennas to said receiving device, a source of audio frequency current, means for modulating currents derived from said other antenna with currents from said source, means for applying said modulated currents to said receiving device, a two-phase motor including a rotor, means for applying currents of one phase derived from said source and of another phase derived from said receiving device to said motor, and means coupling said rotor and said directive antennas.

4. In a radio direction finder, a pair of antennas each having figure 8 response patterns angularly disposed with respect to each other, a radio receiver including an audio output circuit, means coupling one antenna to said receiver, a balanced modulator, means including said modulator for coupling said other antenna to said receiver, an audio frequency current source, means for applying said audio frequency current to said modulator, a two-phase motor including a rotor, means for applying currents derived from said source and said output circuit to said motor, and means coupling said rotor and said antennas whereby the antennas are rotated as a function of the received signals.

5. In a device of the character of claim 4, means for shielding said antennas.

6. In a radio direction finder including a pair of directive antennas, a source of radio signals and a two phase motor, the method of orienting said antennas by means of said two-phase motor which comprises deriving carrier frequency currents from one of said antennas, deriving communication signals from said antenna, deriving currents of side band frequency from the other of said antennas by applying currents of modulation frequency and by eliminating the currents of carrier frequency, combining said first-mentioned carrier frequency currents and said side band frequency currents, deriving an audio output current from said combined currents, applying said audio output and said modulation currents to said two-phase motor to move its rotor as a function of the phase of the received currents, and orienting said antennas by the operation of said motor until the audio output current becomes substantially zero and said communication signals derived from said first-mentioned antenna reach a maximum, and utilizing said communication signals.

7. In a radio direction finder including a pair of directive antennas, a source of radio signals, and a reversible motor, the method of orienting said antennas by means of said reversible motor which comprises deriving carrier frequency currents from one of said antennas deriving communication signals from said antenna, deriving currents of side band frequency from the other of said antennas by applying currents of modulation frequency and by eliminating the currents of carrier frequency, combining said first-mentioned carrier frequency currents and said side band frequency currents, deriving an audio output current from said combined currents, applying said audio output and said modulation currents to said reversible motor to move its rotor as a function of the phase of the received currents, and orienting said antennas by the operation of said motor until the audio output current becomes substantially zero and said communication signals derived from said first-mentioned antenna reach a maximum, and utilizing said communication signals.

8. In a radio direction finder including an indicator, the method of determining direction which comprises deriving a current of carrier frequency from a signal wave whose wave front is to be determined, deriving communication signals from said wave, deriving a second carrier current, modulating said second carrier current by a modulation current, eliminating said second carrier current, deriving currents of side band frequency from said modulated currents, combining said currents of side band frequency and said first-mentioned carrier currents, obtaining from said combined currents a modulating frequency current, deriving forces from said first-mentioned modulation current and said second-mentioned modulating frequency current, and applying said forces to produce rotation of said indicator until the second of said modulating currents becomes substantially zero and said communication signals reach a maximum so that said wave front is indicated by the cessation of said rotation and utilizing said communication signals.

9. In a radio direction finder including self-orienting crossed directive antennas and a source of radio signals, the method of determining direction which comprises deriving from one antenna a current of carrier frequency from a signal wave whose wave front is to be determined, deriving communication signals from said antenna, deriving a second carrier current from said second antenna, modulating said second carrier current by a modulation current, eliminating said second carrier current, deriving currents of side band frequency from said modulated currents, combining said currents of side band frequency and said first-mentioned carrier currents, obtaining from said combined currents a current of modulation frequency, deriving forces from said first-mentioned modulation current and said second-mentioned modulation frequency current, and applying said forces to produce simultaneous rotation of said antennas until the second of said modulating currents becomes substantially zero and said communication signals derived from said first-mentioned antenna reach a maximum whereby said wave front is indicated by the position of said antennas, and utilizing said communication signals.

10. In a system of the character described, the combination of crossed directive antennas, a source of signals, means including a two-phase motor for self-orienting said antennas to a position in which one of said antennas has a maximum response and the other of said antennas has a minimum response to said signals, communication signal-indicating means coupled to said first-mentioned antenna and means coupling said self-orienting means to both of said antennas so that said antennas may be simultaneously used to indicate the direction of the wave front of received signals when said one antenna is used for communication.

11. In a system of the character described, the combination of a pair of directive antennas having their directive patterns disposed so that the maximum of one substantially coincides with the minimum of the other, means coupling said antennas to a radio receiving device, a signal-indicating instrument connected to said device, means including a two-phase motor coupled to the output of said device and responsive as a function of said directive patterns for rotating said directive antennas to a position in which one of said antennas has a maximum response to communication signals at the same time the other of said antennas has a minimum response to the wave front of the carrier waves of said communication signals.

WENDELL L. CARLSON.
DONALD S. BOND.